US007450222B1

(12) United States Patent
Wang et al.

(10) Patent No.: US 7,450,222 B1
(45) Date of Patent: Nov. 11, 2008

(54) CORRELATED-INTENSITY VELOCIMETER FOR ARBITRARY REFLECTOR

(75) Inventors: Zhehui Wang, Los Alamos, NM (US); Shengnian Luo, Los Alamos, NM (US); Cris W. Barnes, Arlington, VA (US); Stephen F. Paul, West Orange, NJ (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 11/772,391

(22) Filed: Jul. 2, 2007

(51) Int. Cl.
*G01P 3/36* (2006.01)
(52) U.S. Cl. .................... 356/28.5; 356/28
(58) Field of Classification Search ............. 356/28, 356/28.5, 450
See application file for complete search history.

(56) References Cited

U.S. PATENT DOCUMENTS

| | | |
|---|---|---|
| 4,026,655 A | 5/1977 | Gunter, Jr. |
| 4,036,557 A | 7/1977 | Christensen |
| 4,148,585 A | 4/1979 | Bargeron et al. |
| 4,346,990 A | 8/1982 | Rhodes |
| 4,397,550 A | 8/1983 | Matsuda et al. |
| 4,402,601 A | 9/1983 | Riva |
| 4,470,696 A | 9/1984 | Ballard |
| 4,537,507 A * | 8/1985 | Hess .................... 356/336 |
| 4,551,017 A | 11/1985 | Mannava et al. |
| 4,600,301 A | 7/1986 | Snyder |
| 4,624,561 A | 11/1986 | Exton |
| 4,632,548 A | 12/1986 | Gunter et al. |
| 4,715,707 A | 12/1987 | Reynolds et al. |
| 4,779,222 A | 10/1988 | Harrison et al. |
| 4,919,532 A | 4/1990 | Mocker et al. |
| 4,925,297 A | 5/1990 | Brown |
| 4,988,190 A * | 1/1991 | Miles .................... 356/28 |
| 4,990,791 A | 2/1991 | Nishi et al. |
| 5,005,144 A | 4/1991 | Nakajima et al. |
| 5,090,801 A | 2/1992 | Johnson |
| 5,094,526 A | 3/1992 | Freud et al. |
| 5,150,170 A | 9/1992 | Morris |
| 5,160,976 A | 11/1992 | Carr et al. |
| 5,179,418 A | 1/1993 | Takamiya et al. |
| 5,187,538 A | 2/1993 | Iwamoto et al. |
| 5,229,830 A | 7/1993 | Ishida et al. |
| 5,272,513 A | 12/1993 | Vahala et al. |
| 5,339,196 A | 8/1994 | Grebe |
| 5,481,359 A | 1/1996 | Barker |

(Continued)

OTHER PUBLICATIONS

Wang, Shehui, "Correlated-Intensity Velocimeter for Arbitrary Reflector for Laser-Produced Plasma Experiments", *Review of Scientific instruments 77, 10E516 Amer, Institute of Physics*, (Oct. 9, 2006), 10E516-1—10E516-4.

*Primary Examiner*—Isam Alsomiri
(74) *Attorney, Agent, or Firm*—Thomas S. O'Dwyer; James C. Durkis; Paul A. Gottlieb

(57) ABSTRACT

A velocimetry apparatus and method comprising splitting incoming reflected laser light and directing the laser light into first and second arms, filtering the laser light with passband filters in the first and second arms, one having a positive passband slope and the other having a negative passband slope, and detecting the filtered laser light via light intensity detectors following the passband filters in the first and second arms.

20 Claims, 4 Drawing Sheets

U.S. PATENT DOCUMENTS

| | | |
|---|---|---|
| 5,483,332 A | 1/1996 | Takamiya et al. |
| 5,502,558 A | 3/1996 | Menders et al. |
| 5,552,879 A | 9/1996 | Takamiya et al. |
| 5,587,785 A | 12/1996 | Kato et al. |
| 5,796,679 A | 8/1998 | Yankielun |
| 5,812,250 A | 9/1998 | Ishida et al. |
| 5,870,192 A | 2/1999 | Barker |
| 6,141,086 A | 10/2000 | Vahala et al. |
| 6,437,855 B1 | 8/2002 | Wilson et al. |
| 6,454,722 B1 | 9/2002 | Numajiri et al. |
| 6,608,668 B2 | 8/2003 | Ghariv et al. |

* cited by examiner

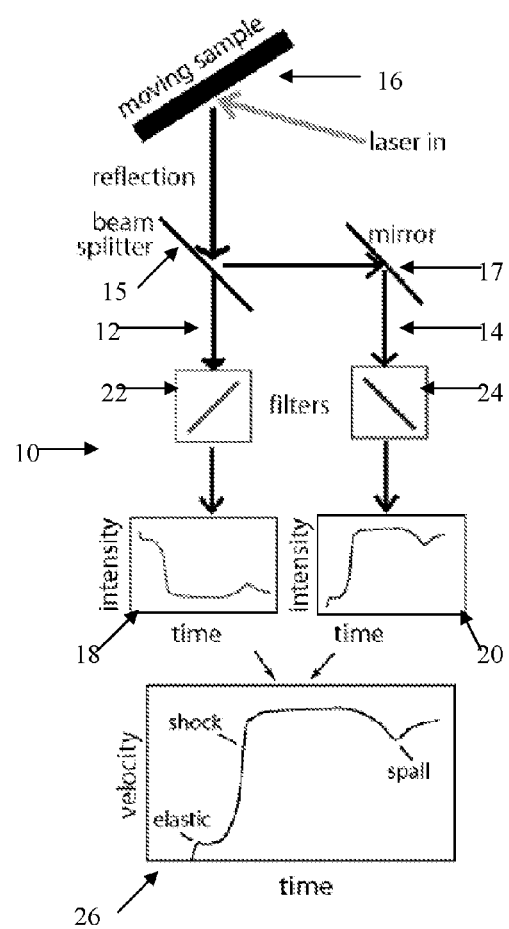
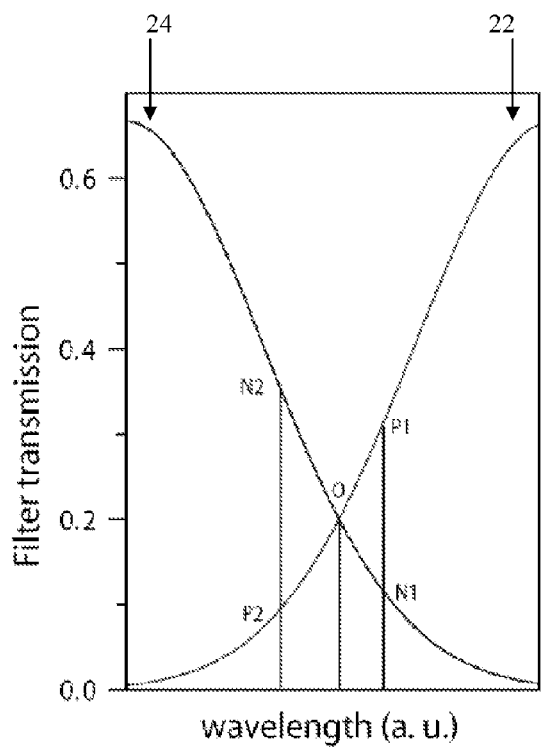
Figure 2(a)
Figure 2(b)

CORRELATED-INTENSITY VELOCIMETER FOR ARBITRARY REFLECTOR

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. W-7405-ENG-36 between the U.S. Department of Energy and Los Alamos National Security LLC for the operation of the Los Alamos National Laboratory.

CROSS-REFERENCE TO RELATED APPLICATIONS

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to method and apparatuses for determining velocities of objects.

2. Description of Related Art

Note that the following discussion refers to a number of publications by author(s) and year of publication, and that due to recent publication dates certain publications are not to be considered as prior art via-a-vis the present invention. Discussion of such publications herein is given for more complete background and is not to be construed as an admission that such publications are prior art for patentability determination purposes.

Velocity versus time measurement is important to laser-produced high-energy density plasma experiments because the transient motion of the surface, which depends on both the equation of the state of the surface material and laser-produced plasma, usually requires submicrosecond time resolution and large dynamic range for velocity measurement. Two examples of laser-produced plasma experiments are shown in FIGS. 1(a) and 1(b). See D. L. Paisley, *Shock Compression of Condensed Matter*, Albuquerque, N.Mex., August 1989, edited by S. C. Schmidt, et al., Elsevier Science, Amsterdam, (1990); R. H. Warnes, et al., AIP Conf. Proc. 370, 495 (1996); and S. Watson, et al., J. Phys. D 33, 170 (2000). These setups can accelerate metal surfaces to high velocities (0.1 to >5 km/s). In FIG. 1(a), the plasma is confined between a transparent substrate and the metal flyer plate to be accelerated. Keeping the laser power below the optical breakdown threshold of the substrate, typically 1 GW/cm$^2$, the laser beam is transmitted through the substrate, depositing energy at the ablative layer between the substrate and the flyer plate. The pressure in the confined plasma expands, accelerating the flyer plate away from the transparent substrate, FIG. 1(b) is for higher laser power, $10^{12}$-$10^{15}$ W/cm$^2$, and lower coupling efficiency. The expanding ablative plasma from one side will accelerate the remaining thickness of the foil/film to a high velocity. Although not as efficient, higher velocities can usually be obtained by this method than that in FIG. 1(a).

One of the most accurate methods for velocity versus time measurement is velocity interferometer system for any reflector (VISAR), L. M. Barker, et al., J. Appl. Phys. 43, 4669 (1972). In VISAR, the Doppler-shifted light from the scattering surface recombines with a time-delayed copy to form an interference pattern with fringes, from which Doppler shift and velocity are obtained. Time evolution of the interference fringes gives the history of velocity of the reflecting surface. Some of the advantages of VISAR are that counting fringes leads to a large dynamic range, and that the built-in equality of light levels in the two interference legs leads to robust contrast. Some of the disadvantages are missed fringes, expense, large amounts of light needed for multiple points, and difficulty in handling multiple frequencies that correspond to different velocities of the reflecting surface. In addition, determining the accuracy and precision of measurements using a VISAR is not straightforward and involves the choice of the velocity-per-fringe (VPF), shock rise time, and temporal resolution of the instrument recording the VISAR raw signals, as well as the quality of the recorded signal. The accuracy and resolution of a given experimental record may not be, and usually is not, consistent over the entire recording time. The accuracy of the recorded signals is ultimately limited by the recording resolution of the Lissajous angle, the phase angle between the sine and cosine of VISAR signals. L. M. Barker, AIP Conf. Proc. 429, 833 (1998). All of the above listed parameters fold together to determine the precision with which data are recorded. Barker and Hollenhach, L. M. Barker, et al., J. Appl. Phys. 45, 3692 (1974), and others, W. F. Hemsing, Rev. Sci. Instrum. 50, 73 (1979), D. D. Bloomquist, et al., Proc. SPIE 348, 523 (1982), addressed the resolution, accuracy, and precision of VISAR data. A value of 1%-3% accuracy and precision is generally regarded as "typical" for good quality of recorded signals, but can be better under "the most ideal" circumstances.

Laser Doppler velocimetry (LDV) is a technique for making noninvasive measurements of surface motion or fluid flow. A Doppler frequency shift $\Delta f_D$ is proportional to the velocity along the reflected beam from the moving target. The frequency shift is measured electronically by mixing the light returning from the target with a reference beam. This system was known to have ambiguity in its measurement of the direction of the motion. Photonic Doppler velocimetry (PDV) or heterodyne velocimeter (HetV), O. T. Strand, et al., Proceedings of the 26th International Congress on High-Speed Photography Photonics, Alexandria, Va. (2004), has recently been demonstrated for velocities up to 3.6 km/s using a 1.55 µm laser, fast digitizers, and other electronics. The velocity of an object is proportional to the b eat frequency of the incident and reflected laser in PDV. For 1 km/s, the beat frequency that must be digitized is 1.29 GHz.

The present invention provides an alternative laser-based technique called correlated-intensity velocimeter for arbitrary reflector (CIVAR), which can also be used for velocity measurement of reflecting surfaces in real time in laser-produced plasma experiments. The invention is described in Z. Wang, et al., "Correlated-Intensity Velocimeter for Arbitrary Reflector for Laser-Produced Plasma Experiments", Rev. Sci. Instrum. 77, 10E516 (2006).

BRIEF SUMMARY OF THE INVENTION

The present invention is of a velocimetry apparatus and method comprising: splitting incoming reflected laser light and directing the laser light into first and second arms; filtering the laser light with passband filters in the first and second arms, one having a positive passband slope and the other having a negative passband slope; and detecting the filtered laser light via light intensity detectors following the passband filters in the first and second arms. In the preferred embodiment, the invention additionally comprises directing laser light at an object of interest, most preferably by employing a diode laser. Splitting preferably employs a fiber splitter, most preferably wherein the first and second arms comprise single-mode optical fibers. The invention preferably calculates a velocity from a ratio between light intensities detected by the light intensity detectors, most preferably by computing velocity u via the equation $$\frac{u}{c} = \frac{1}{2\lambda_0} \frac{T_0(\lambda_0)}{S_0(\lambda_0)} \frac{R_s - 1}{R_s + 1},$$

where c is the speed of light in the medium through which the laser light has passed, $\lambda_0$ is the wavelength of the laser light, $T_0(\lambda_0)$ is the transmission function of the passband filters at $\lambda_0$, $S_0(\lambda_0) = dT_0(\lambda_0)/d\lambda$ is the transmission function slope at $\lambda_0$, and $R_s$ is the relative response of the two arms. Detecting may employ a plurality of detectors, preferably arranged in an array, and most preferably then calculating velocities for each point in the arrays from a ratio between light intensities detected by the light intensity detectors at corresponding points in the arrays.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

in FIG. 1(a), the pressure of the confined laser-generated plasma accelerates the plate away from the substrate; in FIG. 1(b) also a freestanding foil (a few tens of micrometer thick) can be accelerated to higher velocities with higher power but lower coupling efficiency; the size of the diagnostic laser beams for VISAR or the proposed CIVAR is usually smaller than the nonuniformity of the reflecting surface; the reflected laser light can be aligned with the direction of the expected motion of the surface;

FIG. 2(a) is a schematic diagram of a single-point CIVAR system;

FIG. 2(b) shows an example of the interference filter transmission functions.

DETAILED DESCRIPTION OF THE INVENTION

Figure 1:
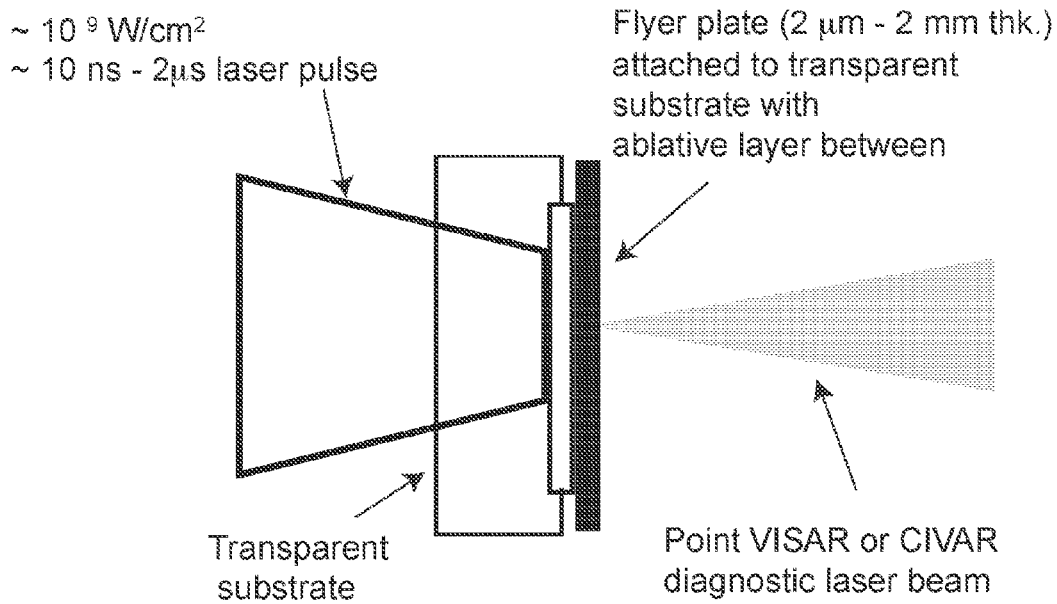
FIGS. 1(a) and 1(b), which represent prior art, show a laser beam of 1-8 mm diameter at ~1 GW/cm$^2$ directed through a transparent substrate to an ablative layer located between the transparent substrate and the metal plate (2 μm-2 mm thick) to be accelerated.
Figure 1:
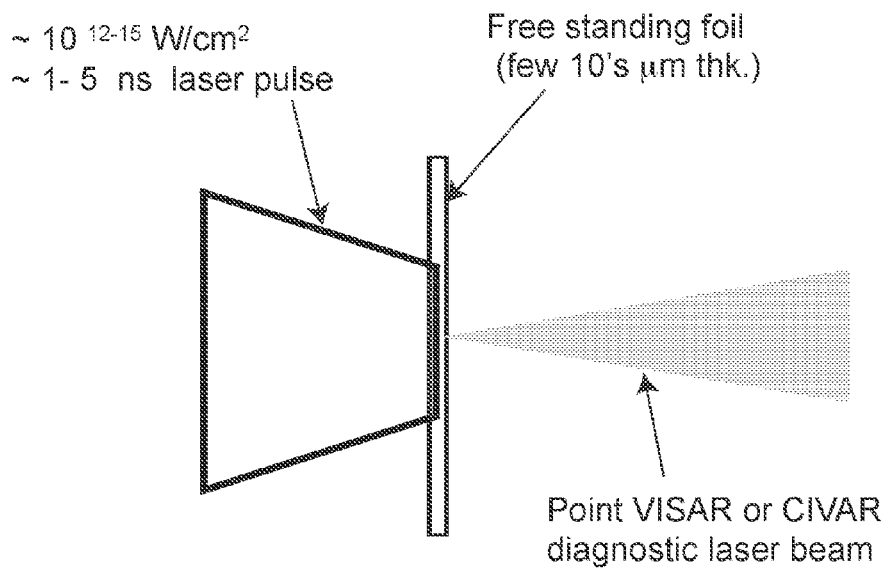

The present invention is of a laser-based apparatus and method, referred to herein as correlated-intensity velocimeter for arbitrary reflector (CIVAR), and provides for velocity measurement of reflecting surfaces in real time. Velocity versus time is an important measurement in, for example, laser-produced high-energy density plasma experiments because the motion of the surface depends on both the equation of the state of the surface material and laser-produced plasma. The physics and working principle of CIVAR relate to those of a previous concept that resolves Doppler shift of plasma light emission using a pair of narrow passband interference filters. However, in CIVAR a reflected laser beam is used instead of plasma emission. Therefore, CIVAR is applicable to both emitting and nonemitting reflecting surfaces. Other advantages of CIVAR include its simplicity, lower cost, and unambiguous data analysis that can be fully automated. The design of a single-point CIVAR is described in detail with emphasis on laser wavelength selection and signal-to-noise ratio. The single-point CIVAR system can be expanded into a multiple-point system straightforwardly. It is possible to use CIVAR to construct a two-dimensional imaging system for a nonuniform velocity field of a large reflecting surface; such a velocity imaging system has applications beyond laser-produced plasma experiments, for example, in shock compression of condensed matter.

CIVAR shares a working principle with a technique successfully used for plasma rotation measurement in a magnetized plasma experiment. S. F. Paul, Rev. Sci. Instrum. 74, 2098 (2003); and S. F. Paul, et al., Rev. Sci. Instrum. 75, 4077 (2004). CIVAR is different from the previous approach in that a laser beam is introduced instead of relying upon plasma emissions. Therefore, CIVAR is applicable to both emitting and nonemitting reflecting surfaces, thus the name "arbitrary reflector." In addition, by using a single-mode laser with a well defined wavelength, ambiguity associated with natural line splitting from plasma ion emissions is eliminated, making the data interpretation more rigorous.

The basic setup of a preferred single-channel CIVAR 10 has two arms 12, 14, called the positive and the negative arm, respectively, as illustrated in FIG. 2(a), created by beam splitter 15 and mirror 17. The Doppler shift due to the motion of a reflecting surface 16 is calculated from the ratio of the light intensities from two detectors 18, 20, $I_+$ and $I_-$ for the positive and the negative arm, respectively, rather than by resolving the wavelength shift of the reflected light with a grating spectrometer or from an interference pattern. The ratio of the gain-normalized signal intensities, each split from the original reflected beam, is not sensitive to changes in the absolute reflected light because the two detectors are made to observe the identical reflection point. In addition, the signal ratio does not depend on any detector or circuit parameters that remain constant because systematic differences such as detector sensitivity, amplifier gain, frequency response, optic losses, etc., are removed by relatively calibrating the two arms. The light passes through the positive arm with an interference filter 22 having a passband with a positive slope ($T_+(\lambda)$ curve in FIG. 2(b)) and the other arm through a negative-slope passband filter 24 ($T_-(\lambda)$ curve in FIG. 2(b)). The ratio of $I_+/I_-$ does change if the wavelength of the reflected light is Doppler shifted from $\lambda_0$, the incident laser wavelength. The instantaneous velocity (u) of the reflecting surface can ideally map to the intensity ratio of the two detectors as (S. N. Luo, et al., LANL Internal Report No. LA-UR-06-2510 (2006)):

$$\frac{u}{c} = \frac{1}{2\lambda_0} \frac{T_0(\lambda_0)}{S_0(\lambda_0)} \frac{R_s - 1}{R_s + 1}, \quad (1)$$

where c is the speed of light in air (or the medium when CIVAR is applied), $\lambda_0$ is the wavelength of the laser, $T_0(\lambda_0)$ is the transmission function of the filters at $\lambda_0$, $S_0(\lambda_0) \equiv dT_0(\lambda_0)/d\lambda$ is the transmission function slope at $\lambda_0$, and $R_s$ is the relative response of the two arms, that is, $R_s = (I_+ G_-/I_- G_+)$ with $I_+/I_-$ being the overall response of the positive/negative arm to a unit intensity light signal and $G_+/G_-$ being the overall gain of the positive/negative arm. Eq. (1) is for the ideal situation when the transmission functions for two filters ($T_\pm$) are the same at $\lambda_0$, i.e., $T_0(\lambda_0) = T_\pm(\lambda_0)$, and when the slopes of the two filters are the same and linear, i.e., $dT_0(\lambda_0)/d\lambda \equiv dT_\pm(\lambda_0)/d\lambda$. More generalized transmission functions $T_\pm(\lambda)$ make Eq. (1) more complex. Processor 26 makes the computation to calculate the velocity, and may be a microcomputer, field-programmable gate array, application specific integrated circuit, or like hardware/software for making such calculation.

One of the critical parameters to measure the performance of a CIVAR system is its velocity resolution. Assume that the incident laser wavelength uncertainty is negligible ($\delta\lambda/\lambda_0 < 10^{-5}$). From Eq. (1), one obtains that the relative velocity resolution is given by:

$$\left(\frac{\delta u}{u}\right)^2 = \left(\frac{\delta T_0}{T_0}\right)^2 + \left(\frac{\delta S_0}{S_0}\right)^2 + 4\left(\frac{\delta R_s}{R_s^2 - 1}\right)^2. \quad (2)$$

To obtain Eq. (2), assume that the uncertainties $\delta T_0$, $\delta S_0$, and $\delta R_s$ are independent of each other. The uncertainties $\delta T_0$ and $\delta S_0$ are from the filters, and $\delta R_s$ is primarily from the detectors. $\delta T_0$ and $\delta S_0$ strongly depend on the filter temperature since the center wavelength of an interference filter shifts linearly with changes in ambient temperature. In practice, $\delta T_0$ and $\delta S_0$ are minimized by stabilizing the temperature of the filters within 0.1° C., and the velocity resolution is mainly limited by the last term (detector noise) in Eq. (2). Therefore, combining Eqs. (1) and (2), the absolute velocity resolution is approximated by:

$$\delta u = \frac{c}{\lambda_0} \frac{T_0(\lambda_0)}{S_0(\lambda_0)} \frac{\delta R_s}{(R_s + 1)^2}, \quad (3)$$

For example, for a pair of filters with a linear passband slope of 100% per nanometer (that is, $T_0(\lambda_0)/S_0(\lambda_0) = 1$ nm), $\lambda_0 \sim 500$ nm, $R_s \sim 1$, and $\delta R_s = 1\%$, one obtains $\delta u = 1.5$ km/s from Eq. (3), consistent with the previous results.

In most laser-produced plasma experiments, 1 km/s velocity resolution is usually not sufficient. Based on Eq. (3), better velocity resolution can be achieved using a combination of longer wavelength $\lambda_0$ and more intense laser, leading to smaller $\delta R_s$. Assuming similar interference filters can be made for longer wavelengths, such as the 10 μm $CO_2$ laser, one can expect velocity resolution of 7.5 m/s for $\delta R_s = 0.1\%$. For a detector with a quantum efficiency of 0.4, the laser power is estimated to be at least 0.2 mW.

Another important characteristic of a CIVAR system is its time resolution, which is essentially determined by the time response of the detectors. Photomultiplier tubes (PMTs) can be used for detectors for nanosecond and faster time response and high quantum efficiency for photon-to-electron conversion. However, the use of PMT detectors limits the illuminating laser to a maximum wavelength of about 1.7 μm (Hamamatsu PMT R3809U-69) with a rise time of 0.17 ns and transit time of 0.1 ns. To provide a velocity resolution of ~50 m/s using a laser of 1.5 μm wavelength, the signal-to-noise ratio needed is about $10^3$:1. If the noise floor is dominated by photon statistics, $2 \times 10^6$ photoelectrons (the factor of 2 is from two detectors) must be counted during the period that needs to be resolved, which is equivalent to a reflected flux of $2 \times 10^7$ photons, assuming a quantum efficiency of 10%. Therefore, a reflected laser power of ~3 mW at 1.5 μm is needed to achieve 1 ns time resolution.

It is preferred to use 1.55 μm diode laser (e.g., IPG Photonics, erbium fiber lasers, continuous up to 100 W or pulsed up to 0.5 mJ) for a single-point CIVAR system. The telecommunications industry has built a large variety of optical and broadband electrical components for 1.55 μm solid-state lasers. The optical paths in FIG. 2(a) are preferably replaced by single-mode optical fibers (e.g., Corning, SMF-28e) for flexibility in directing both the incident and reflected laser beams without using mirrors. The beam splitter (BS) function in FIG. 2(a) is preferably achieved by using fiber splitters (e.g., JDS Uniphase). The pair of interference filters can be obtained from Barr Associates and other interference filter manufacturers. For the two detectors to convert optical signals into electrical signals, it is preferred to use the Hamamatsu PMT R3809U-69 or InGaAs detector (e.g., Newprot/Oriel). The electrical signals from the two detectors are amplified and transmitted to a computer that runs an algorithm that converts the ratio of the two detector signals into velocity versus time history in real time using calibrated data about the two interference filters and detectors. One advantage of CIVAR is that the whole measurement and analysis process can be fully automated once the system is calibrated.

The principle and design of a single-point CIVAR are next described. The focus has been on the intensity and wavelength of the laser regarding CIVAR velocity resolution. Compared with the previous works, the systematic error due to the finite width of light—natural broadening and line splitting—is completely eliminated in CIVAR. There could be issues with self-emission of the reflecting surface affecting measured intensity ratio that must be considered. Other systematic errors come from deviation of the filter transmission functions from linearity (0.1% deviation from linearity has been demonstrated for He II 498.6 nm) and the incidental angles of the reflected laser light on the interference filters (which can be controlled using a pair of beam expanders that convert the reflected light into parallel beams in front of the filter pairs). It is not known if the linearity of the filters can meet the requirement so that $\delta S_0$ and $\delta T_0$ are small enough to achieve the desired velocity resolution in a 1.55 μm system. Because of the use of a monochromatic laser light in CIVAR, the requirement on filter linearity is relaxed. If we can calibrate the filters properly, two realistic (measured after the filters have been made) transmission functions can be obtained. The realistic transmission functions can then be used in data analysis to achieve the desired $\delta R_s$. Compared with VISAR, or other heterodyne interferometry techniques (such as a microwave reflectometry) in this regard, coherence of the reflected laser light, or in other words, phase information of the reflected light, is not required for CIVAR. Therefore small nonuniformities on the reflecting surfaces, which can reduce reflected light level, are not expected to create significant problem for CIVAR.

Figure 3A:
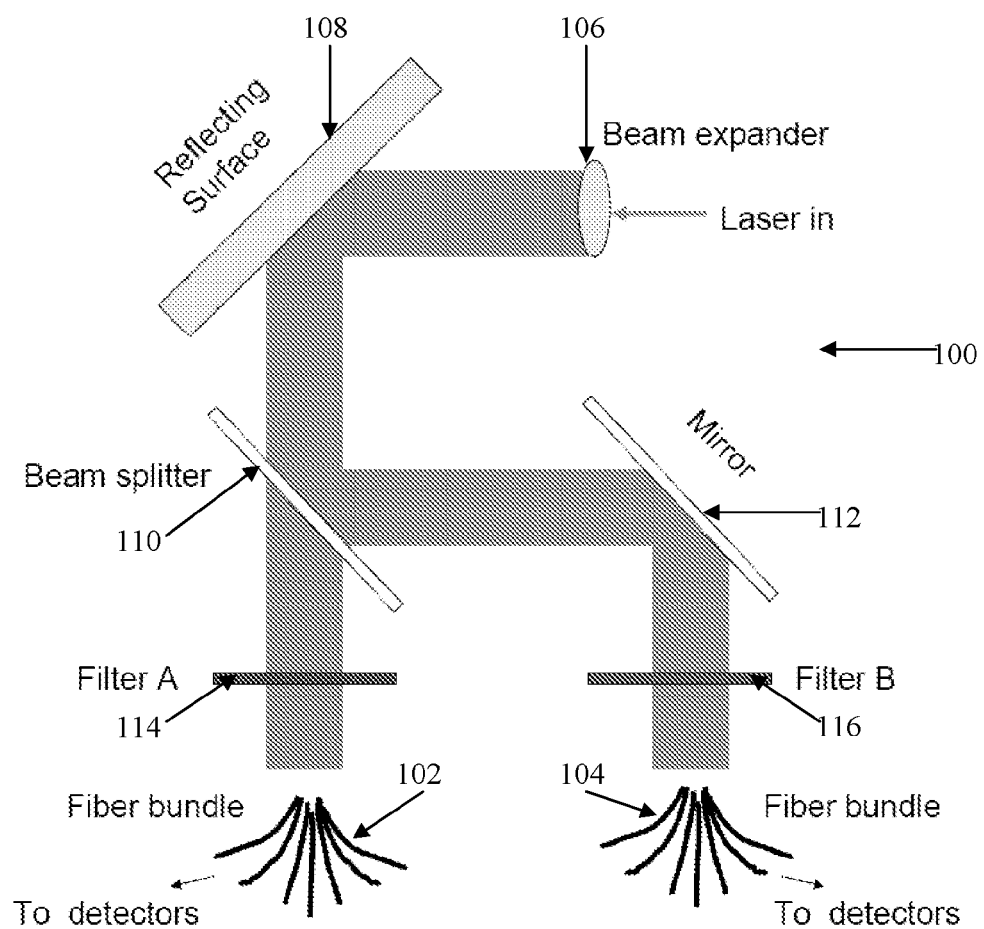
FIGS. 3(a) and 3(b) are schematic diagrams of a multi-point CIVAR system according to the invention.
Figure 3B:
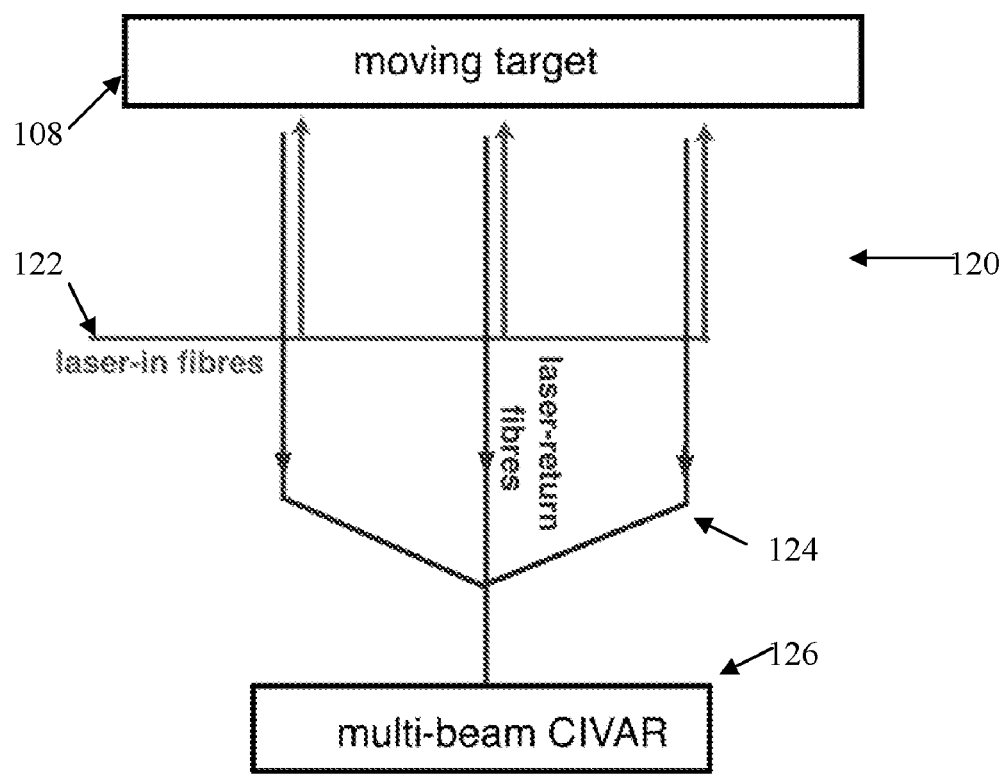

It is also possible to use the CIVAR concept to construct a multipoint or two-dimensional imaging system for a non-uniform velocity field of a large reflecting surface, as shown schematically in FIGS. 3(a) and 3(b). FIG. 3(a) shows a system 100, comprising beam expander 106, reflecting surface 108, beam splitter 110, mirror 112, and filters 114, 116, and at the detector and two fiber bundles 102, 104 split into multiple individual fibers. Each fiber preferably feeds into its own detector for fast time response. Additional collimators which limit the field of view of individual fibers may be added for better collimation and pin-pointing on the reflecting surface. FIG. 3(b) illustrates an alternative system 120 in which spatial resolution can be achieved via optical fibers 122, 124. Multiple returning laser beams carrying the spatially resolved velocity information are fed thereby into a multi-beam CIVAR system 126, which is simply composed of a plurality of single-point CIVAR systems. Such velocity imaging systems as shown in FIGS. 3(a) and 3(b) have applications beyond laser-produced plasma experiments, for example, in shock compression of condensed matter.

Other uses of the invention include as a motion monitor for micro-cantilevers used in Atomic Force Microscopes (AFM) and other nano-sensors and nano-probes. Existing techniques can not resolve the wavelength-shift at all; they simply monitor on-and-off of laser light. The invention provides a new capability to monitor velocity and motion of nano-sensors and nano-probes.

Yet another application of the invention is for environment and disaster monitoring and alert (air quality—concentration of dust, pollens, etc.; pollutant concentration, propagation of pollutants). The key advantage is the real-time capability and compact system provided by the invention. Existing devices often require sampling and lengthy laboratory analysis afterwards. However, the invention can provide real-time capability of the air and environment. Due to its simplicity, products can be developed that are suitable for amateur use.

Another use of the invention is in a hand-held device for surveillance and early warning of high-speed objects, such as airplanes, missiles, satellites, meteors, etc. The key advantage is again the real-time capability and compact system provided.

Other applications include use for highways (automobiles speed monitoring) and meteorology (cloud, tornado tracking). Advantages over existing are again real-time capabilities and compactness of the system.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A velocimeter comprising:
a beamsplitter receiving incoming reflected laser light and directing the laser light into first and second arms;
passband filters in said first and second arms, one having a positive passband slope and the other having a negative passband slope; and
light intensity detectors following said passband filters in said first and second arms.

2. The velocimeter of claim 1 additionally comprising a laser light source directed at an object of interest.

3. The velocimeter of claim 2 wherein said laser light source comprises a diode laser.

4. The velocimeter of claim 1 wherein said beamsplitter comprises a fiber splitter.

5. The velocimeter of claim 4 wherein said first and second arms comprise single-mode optical fibers.

6. The velocimeter of claim 1 additionally comprising a processor calculating a velocity from a ratio between light intensities detected by said light intensity detectors.

7. The velocimeter of claim 6 wherein said calculating means computes velocity u via the equation $$\frac{u}{c} = \frac{1}{2\lambda_0} \frac{T_0(\lambda_0)}{S_0(\lambda_0)} \frac{R_s - 1}{R_s + 1},$$

where c is the speed of light in the medium through which the laser light has passed, $\lambda_0$ is the wavelength of the laser light, $T_0(\lambda_0)$ is the transmission function of said passband filters at $\lambda_0$, $S_0(\lambda_0) \equiv dT_0(\lambda_0)/d\lambda$ is the transmission function slope at $\lambda_0$, and $R_s$ is the relative response of said two arms.

8. The velocimeter of claim 1 comprising a plurality of detectors.

9. The velocimeter of claim 8 comprising a plurality of detectors arranged in an array.

10. The velocimeter of claim 9 additionally comprising one or more processors calculating velocities for each point in said arrays from a ratio between light intensities detected by said light intensity detectors at corresponding points in said arrays.

11. A velocimetry method comprising the steps of:
splitting incoming reflected laser light and directing the laser light into first and second arms;
filtering the laser light with passband filters in the first and second arms, one having a positive passband slope and the other having a negative passband slope; and
detecting the filtered laser light via light intensity detectors following the passband filters in the first and second arms.

12. The method of claim 11 additionally comprising the step of directing laser light at an object of interest.

13. The method of claim 12 wherein the directing step comprises employing a diode laser.

14. The method of claim 11 wherein the splitting step comprises employing a fiber splitter.

15. The method of claim 14 wherein the first and second arms comprise single-mode optical fibers.

16. The method of claim 11 additionally comprising the step of calculating a velocity from a ratio between light intensities detected by the light intensity detectors.

17. The method of claim 16 wherein the calculating step comprises computing velocity u via the equation $$\frac{u}{c} = \frac{1}{2\lambda_0} \frac{T_0(\lambda_0)}{S_0(\lambda_0)} \frac{R_s - 1}{R_s + 1},$$

where c is the speed of light in the medium through which the laser light has passed, $\lambda_0$ is the wavelength of the laser light, $T_0(\lambda_0)$ is the transmission function of the passband filters at $\lambda_0$, $S_0(\lambda_0) \equiv dT_0(\lambda_0)/d\lambda$ is the transmission function slope at $\lambda_0$, and $R_s$ is the relative response of the two arms.

18. The method of claim 11 wherein the detecting step comprises employing a plurality of detectors.

19. The method of claim 18 wherein the detecting step comprises employing a plurality of detectors arranged in an array.

20. The method of claim 19 additionally comprising the step of calculating velocities for each point in the arrays from a ratio between light intensities detected by the light intensity detectors at corresponding points in the arrays.

* * * * *